United States Patent
Kim et al.

(10) Patent No.: US 7,319,685 B2
(45) Date of Patent: Jan. 15, 2008

(54) METHOD FOR ASSIGNING CHANNELS BASED ON SPATIAL DIVISION MULTIPLEXING IN AN ORTHOGONAL FREQUENCY DIVISION MULTIPLEXING SYSTEM WITH MULTIPLE ANTENNAS

(75) Inventors: Eung-Sun Kim, Suwon-si (KR); Jong-Hyeuk Lee, Seongnam-si (KR); Jae-Hak Chung, Seoul (KR); Ho-Jin Kim, Seoul (KR); Joo-Hwan Chun, Daejeon (KR); Kyung-Chun Lee, Daejeon (KR); Il-Han Kim, Daejeon (KR)

(73) Assignees: Samsung Electronics Co., Ltd. (KR); Korea Advanced Institute of Science and Technology (KR)

( * ) Notice: Subject to any disclaimer, the term of this patent is extended or adjusted under 35 U.S.C. 154(b) by 257 days.

(21) Appl. No.: 10/988,876

(22) Filed: Nov. 15, 2004

(65) Prior Publication Data

US 2005/0130684 A1 Jun. 16, 2005

(30) Foreign Application Priority Data

Nov. 13, 2003 (KR) ............. 10-2003-0080351

(51) Int. Cl.
*H03J 3/00* (2006.01)
(52) U.S. Cl. ............. 370/337; 370/334; 370/208; 455/562.1; 455/101

(58) Field of Classification Search ........... 370/334, 370/208, 337; 455/562.1, 561, 101
See application file for complete search history.

(56) References Cited

U.S. PATENT DOCUMENTS

| | | | |
|---|---|---|---|
| 2002/0158801 A1* | 10/2002 | Crilly et al. | 342/378 |
| 2002/0177447 A1* | 11/2002 | Walton et al. | 455/452 |
| 2003/0076777 A1 | 4/2003 | Stuber et al. | |
| 2003/0087673 A1* | 5/2003 | Walton et al. | 455/562 |
| 2003/0128658 A1 | 7/2003 | Walton et al. | |
| 2003/0161282 A1* | 8/2003 | Medvedev et al. | 370/329 |
| 2004/0023621 A1* | 2/2004 | Sugar et al. | 455/103 |
| 2004/0081131 A1* | 4/2004 | Walton et al. | 370/344 |

FOREIGN PATENT DOCUMENTS

| | | |
|---|---|---|
| WO | WO 01/76110 | 10/2001 |
| WO | WO 02/49306 | 6/2002 |

* cited by examiner

*Primary Examiner*—Danh Le
(74) *Attorney, Agent, or Firm*—The Farrell Law Firm PC

(57) ABSTRACT

A method for assigning a single frequency sub-channel to a plurality of MSs (Mobile Stations) in an OFDM (Orthogonal Frequency Division Multiplexing) system utilizing SDM (Spatial Division Multiplexing) with multiple transmit/receive antennas. In the method, a BS (Base Station) can effectively assign a pilot channel to estimate a downlink channel. The BS divides the single frequency sub-channel into a plurality of spatial channels, and sequentially assigns the plurality of spatial channels to the MSs having the maximum communication capacity, thereby transmitting signals of the MSs through the single frequency sub-channel.

8 Claims, 7 Drawing Sheets

METHOD FOR ASSIGNING CHANNELS BASED ON SPATIAL DIVISION MULTIPLEXING IN AN ORTHOGONAL FREQUENCY DIVISION MULTIPLEXING SYSTEM WITH MULTIPLE ANTENNAS

PRIORITY

This application claims priority to an application entitled "METHOD FOR PERFORMING CHANNEL ASSIGNMENT BASED ON SPATIAL DIVISION MULTIPLEXING IN ORTHOGONAL FREQUENCY DIVISION MULTIPLEXING SYSTEM WITH MULTIPLE TRANSMIT/RECEIVE ANTENNAS", filed in the Korean Intellectual Property Office on Nov. 13, 2003 and assigned Ser. No. 2003-80351, the contents of which are incorporated herein by reference.

BACKGROUND OF THE INVENTION

1. Field of the Invention

The present invention relates to a method for assigning a pilot channel to estimate a downlink channel in a mobile communication system having multiple transmission and/or reception antennas.

2. Description of the Related Art

Because conventional mobile communication systems based on CDMA (Code Division Multiple Access) and TDMA (Time Division Multiple Access) are systems developed to provide mainly voice services. As such, they are not equipped for next generation mobile communication systems providing high-quality multimedia services.

Accordingly, a need exists for technology for efficiently using limited frequency resources to provide the multimedia services. As the next generation of mobile communication technology, OFDM (Orthogonal Frequency Division Multiplexing) technology to the mobile communication systems is notable because mobile communication systems based on the OFDM technology can support a high data transmission rate in a parallel structure for transmitting high-speed signals through sub-carrier frequencies or sub-carriers known as frequency sub-channels. The frequency sub-channels are orthogonal to prevent interference therebetween. To minimize a spectral interval, frequency sub-channel spectra are transmitted in an overlapped state.

In a mobile communication system based on MIMO (Multi-Input Multi-Output) technology separated from the mobile communication system based on the OFDM technology, a transmitting side includes a plurality of antennas and assigns different data to the respective antennas to transmit the assigned data, thereby improving a data transmission rate.

A mobile communication system for combining the OFDM technology and the MIMO technology is being discussed such that communication quality and data throughput can be improved through the OFDM and MIMO technologies. However, a conventional OFDM system using the MIMO technology considers only that a single frequency sub-channel is only assigned to a single MS (Mobile Station). Therefore, the conventional OFDM system has a drawback in that beamforming and space-time coding are limited because each frequency sub-channel is assigned to each MS and each MS has a single antenna. Because a saturation phenomenon occurs in which system performance cannot be further improved when the number of antennas increases above a predetermined number, there is another drawback in that the overall communication capacity is limited even though the MS has at least one antenna.

When the number of BS (Base Station) antennas is relatively close the number of MS antennas in the OFDM system based on the MIMO technology, the maximum communication capacity can be ensured. However, the MS can be equipped with a smaller number of antennas than the BS in the real environment. For example, the BS may have a large number of antennas, while the MS has four antennas or less.

Accordingly, the OFDM system based on the MIMO technology has a number of problems. For example, there is a problem in that the communication capacity of the overall system is limited by the number of antennas of a corresponding MS, regardless of the number of antennas of the BS. That is, when the number of BS antennas is significantly larger than the number of MS antennas, the conventional OFDM system is inappropriate.

Moreover, there is another problem in that a single frequency sub-channel is only assigned to a single MS. That is, because the MS has a single antenna, the single frequency sub-channel cannot be efficiently assigned on the basis of the communication capacity of the MS.

SUMMARY OF THE INVENTION

Accordingly, the present invention has been designed to solve the above and other problems occurring in the prior art. Therefore, it is an object of the present invention to provide a method for assigning a single frequency sub-channel to a plurality of MSs (Mobile Stations) in an OFDM (Orthogonal Frequency Division Multiplexing) system based on SDM (Spatial Division Multiplexing) with multiple transmit/receive antennas.

It is another object of the present invention to provide a method by which a BS (Base Station) can effectively assign a pilot channel to estimate a downlink channel in a MIMO-OFDM system based on SDM.

In accordance with a first embodiment of the present invention, the above and other objects can be accomplished by a method for assigning spatial channels from a BS (including multiple transmit antennas to MSs respectively including multiple receive antennas in an OFDM system for transmitting data using a plurality of frequency sub-channels. The method includes: assigning a plurality of spatial channels to each of the frequency sub-channels; and sequentially selecting MSs capable of maximizing a total communication capacity of the spatial channels while assigning the spatial channels assigned to each sub-channel to the MSs, one by one.

In accordance with a second embodiment of the present invention, the above and other objects can be accomplished by a method for transmitting pilot signals from a BS to a plurality of MSs such that the plurality of MSs can estimate a downlink channel in an OFDM system including the plurality of MSs respectively having $N_r$ receive antennas and the BS having $N_T$ transmit antennas, where $N_T$ is at least equal to $N_r$. The method includes: selecting K pilot matrices including a predetermined number of sequences selected from an L×L orthogonal matrix including L number of pilot sequences having an orthogonal pilot length of L, such that the pilot matrices minimally overlap each other; and assigning the K pilot matrices to k MSs.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION OF THE PREFERRED EMBODIMENTS

Preferred embodiments of the present invention will be described in detail herein below with reference to the annexed drawings. In the following description, a detailed description of known functions and configurations incorporated herein will be omitted when it may obscure the subject matter of the present invention.

The present invention proposes a scheme for increasing limited communication capacity while utilizing SDM (Spatial Division Multiplexing) technology for spatially multiplexing different MS signals in an OFDM (Orthogonal Frequency Division Multiplexing) system based on MIMO (Multi-Input Multi-Output) technology. Briefly, a first embodiment of the present invention proposes a scheme for increasing the communication capacity of the overall system in proportion to the number of MSs sharing a single frequency sub-channel when assigning the single frequency sub-channel to the MSs using the SDM technology. That is, a single BS spatially multiplexes different MS signals and the MSs share the same frequency and time band using the SDM technology. A second embodiment of the present invention proposes an optimized algorithm and an effective pilot channel assignment process for estimating a downlink channel when the BS performs channel assignment to a downlink in an OFDM system based on the MIMO technology.

First Embodiment

Figure 1:
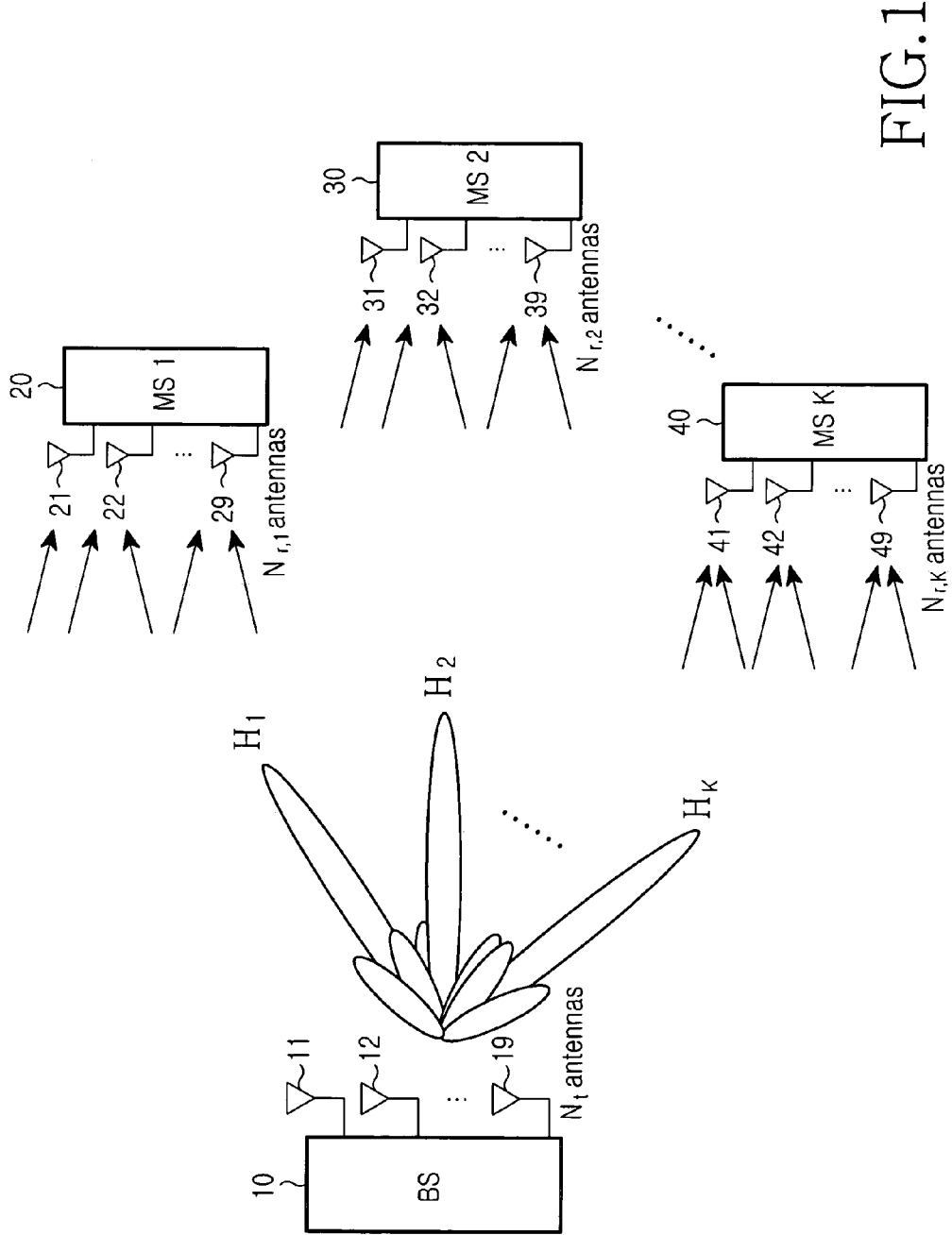
FIG. 1 schematically illustrates a mobile communication system based on SDM (Spatial Division Multiplexing) in accordance with the present invention.

FIG. 1 schematically illustrates a mobile communication system utilizing SDM (Spatial Division Multiplexing) in accordance with the present invention. Referring to FIG. 1, a BS 10 assigns a single frequency sub-channel to a plurality of MSs using multiple transmit antennas 11, 12, and 19, in the mobile communication system. Accordingly, all MSs 20, 30, 40, etc., share the same frequency and time band, and simultaneously use different spatial channels. Herein, channels from the multiple transmit antennas to multiple receive antennas are referred to as spatial channels.

In FIG. 1, it is assumed that the number of MSs sharing the single frequency sub-channel of the BS 10 is K and the number of BS antennas is $N_t$. In this case, it is assumed that the number of antennas of a $k^{th}$ MS is $N_{r,k}$. Characteristics of a channel impulse response between the BS 10 and the $k^{th}$ MS through the single frequency sub-channel can be expressed by an $N_{r,k} \times N_t$ matrix $H_k$. Signals between the MSs sharing the single frequency sub-channel must not interfere with each other. When interference between the MSs is present, the reliability of a signal to be transmitted is degraded and the communication capacity is reduced. Therefore, when the BS 10 transmits a signal, it multiplies a nulling matrix $W_k$ by the signal to be transmitted in order to cancel the interference between the MSs. The nulling matrix $W_k$ is used to assign all channels of (K−1) remaining MSs, except for the $k^{th}$ MS, to a null space. The nulling matrix $W_k$ is defined as an $N_{r,k} \times \bar{N}_{t,k}$ unitary matrix where $$\bar{N}_{t,k} = N_t - \sum_{l \neq k} N_{r,l}.$$

The overall nulling matrix $W_k$ can be obtained by performing SVD (Singular Value Decomposition) associated with channel characteristics of (K−1) MSs to determine the null space. When a signal to be transmitted from the BS to the $k^{th}$ MS is written in the form of a vector $x_k$ with a size of $\bar{N}_{t,k} \times 1$, a received signal $y_k$ of the $k^{th}$ MS is expressed by Equation (1).

$$y_k = H_k W_k x_k + n_k \quad (1)$$

In Equation (1), $n_k$ is noise applied to receive antennas of the $k^{th}$ MS, and has a vector with a size of $N_{r,k} \times 1$. When $H_k W_k$ is defined as $\bar{H}_k$, Equation (1) can be expressed as Equation (2).

$$y_k = \bar{H}_k x_k + n_k \quad (2)$$

It can be seen that $\bar{H}_k$ is a channel characteristic value of the $k^{th}$ MS, and interference components from other MSs are fully cancelled from the single frequency sub-channel. However, in order for the interference between the MSs to be fully cancelled, it must be satisfied that $$N_t \geq \sum_{k=1}^{K} N_{r,k}.$$

That is, the number of transmit antennas of the BS 10 must be larger than the number of receive antennas of the MS.

Therefore, the mobile communication system based on the SDM technology must consider other MSs sharing the same frequency sub-channel in order to perform channel assignment. When K MSs use the single frequency sub-channel, $\bar{H}_k$ is generated according to SDM because channels of the MSs interfere with each other.

When two MSs 20 and 30 use channels that are similar to the single frequency sub-channel, it is difficult for an interference component between the MSs 20 and 30 to be cancelled. If the interference component between the MSs is not cancelled, the overall communication capacity of the mobile communication system is seriously reduced. Accordingly, the BS 10 needs to determine a set of MSs to which the single frequency sub-channel is assigned using channel information of the MSs 20, 30, 40, etc. That is, the BS 10 must maximize the overall communication capacity of the mobile communication system by determining an MS set (or user set) to which the single frequency sub-channel is assigned, and must consider user channel characteristics in all frequency sub-channels to satisfy a data transmission rate required for each MS.

Accordingly, one available method considers a channel correlation between MSs to assign a channel according to the SDM technology. That is, the method calculates a channel correlation between the MSs (or users) and assigns a frequency sub-channel to the MSs. However, the method based on channel correlation cannot be an optimized algorithm because it does not take into account a data transmission rate of each user.

Another method calculates the communication capacity using a channel characteristic value $\overline{H}_k$ of each user according to the SDM technology and first assigns a channel according to the maximum communication value. A real data transmission rate or communication capacity may be slightly different than the data transmission rate or communication capacity calculated in the method. However, because data is transmitted through multiple antennas using the MIMO technology, a channel can be assigned that has almost the maximum communication capacity. Therefore, the MS (or user) channel with the maximum communication capacity value can be assigned as one frequency sub-channel. An MS (or user) having the maximum communication value is determined to be an SDM user.

Assuming that the total number of users is $K_a$ and the number of spatial channels assignable according to the SDM technology is $K_s$, the number of users according to possible combinations is expressed by Equation (3).

$$K_a!/[(K_{a-Ks})!K_s!] \quad (3)$$

To obtain a combination associated with the maximum communication capacity, $\overline{H}_k$ of each user channel is obtained according to the SDM technology, and the communication capacity is calculated using $\overline{H}_k$ of each user channel.

When the total number of users increases, the number of combinations exponentially increases, such that implementation complexity increases. Accordingly, the present invention proposes an optimal method for considering all user sets and calculating the communication capacity.

Figure 2:
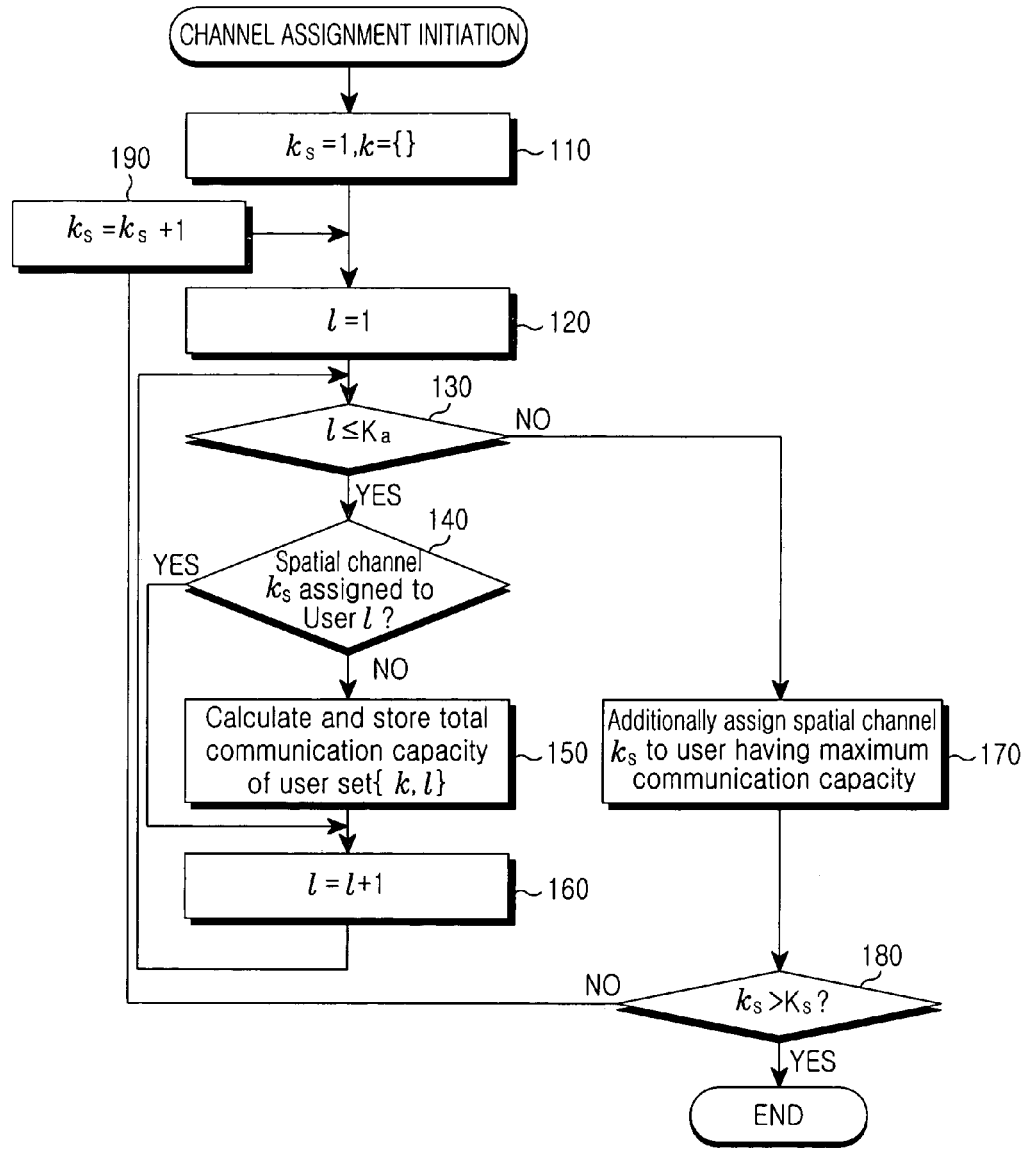
FIG. 2 is a flow chart illustrating a process for performing a channel assignment algorithm based on SDM in accordance with the present invention.

FIG. 2 is a flow chart illustrating a process for performing a channel assignment algorithm based on SDM in accordance with the present invention. Referring to FIG. 2, a frequency sub-channel is assigned to a user set with the maximum communication capacity. While the value of a spatial channel index is sequentially incremented from Index 1, an optimal user set for the respective spatial channels is obtained.

First, a spatial channel index is set to an initial value $k_s=1$ and a user set to which spatial channels are assigned is set to K={ } in step 110. A first user index l (=1) is input in step 120, and a determination is made as to whether a value of the user index l is equal to or smaller than the total number of users, $K_a$, in step 130. If a value of the user index l is equal to or smaller than the total number of users, $K_a$, the process proceeds to step 140.

In step 140, it is determined whether a spatial channel $k_s$ (=1) has been assigned to User l. If the spatial channel $k_s$ (=1) has not been assigned to User l, it is assigned to User l, and the communication capacity of the spatial channel $k_s$ of User l is calculated and stored in step 150. However, if the spatial channel $k_s$ has already been assigned to User l, the process proceeds directly to step 160. While a value of the user index l is incremented by one, a corresponding operation associated with the next user is performed.

When a value of the user index l is greater than the total number of users, $K_a$, in step 130, i.e., when user l is the last user to which the spatial channel can be assigned, the process proceeds to step 170. In step 170, the BS selects a user having the maximum communication capacity and assigns a spatial channel $k_s$ to the selected user. Here, the BS selects a user having the maximum communication capacity among communication capacities calculated according to the spatial channels assigned to all users belonging to the total number of users, $K_a$, and assigns the spatial channel, $k_s$, to the selected user.

In step 180, the BS determines if the spatial channel index $k_s$ is larger than the total number of spatial channels, $K_s$, that is, if the current channel is the last spatial channel. If the spatial channel index $k_s$ is equal to or smaller than the total number of spatial channels, $K_s$, the process proceeds to step 190. While a value of the spatial channel index is incremented by one in step 190, steps 120 to 160 are repeated. That is, a user set with the optimized communication capacity to which a subsequent spatial channel is assigned is obtained.

However, if the spatial channel index $k_s$ is larger than the total number of spatial channels $K_s$, assignable spatial channels are assigned to all users with the optimized communication capacity, such that the channel assignment process is completed.

As described above, when only a single spatial channel is present, a user with the maximum communication capacity is selected, and the maximum communication capacity of the selected user is compared with the communication capacity of all MIMO channels. While the spatial channel index is incremented by one when the first user is selected, a spatial channel of a corresponding index is assigned to another user capable of maximizing the overall communication capacity of all spatial channels in a set of already selected users. When another user is added to k−1 already selected users in a $k_s^{th}$ spatial channel, a user capable of maximizing the overall communication capacity is selected. In the above-described method, an SDM user set can be assigned to a single frequency sub-channel by using the reduced number of computations required when the totally optimized communication capacity is calculated for $$\left(\sum_{k=1}^{K} K_a - k + 1\right)$$

number of users.

Because the MSs to which a frequency sub-channel is assigned are selected to satisfy the overall communication capacity of a corresponding frequency sub-channel, the communication capacity of each MS or user may not be satisfied. Therefore, a channel re-assignment process is required to satisfy the communication capacity of each MS or user.

When a user is replaced by another user with the maximum communication capacity in a user set $\{k_1, k_2, \ldots, k_K\}$ to which spatial channels have already been assigned, a spatial channel can be assigned to another user. That is, to optimize the total communication capacity, a user $k_n$ is replaced by another user $\overline{k}_n$ in the user set $\{k_1, k_2, \ldots, k_K\}$ to which spatial channels are assigned. The above-described process continues until the communication capacity cannot be further increased.

In a procedure for optimizing communication capacity, first, a communication capacity $C_k$, assigned to each MS on the basis of all frequency sub-channels, is calculated. Then, a difference $\Delta C_k (=C_k-\overline{C}_k)$ between a communication capacity $\overline{C}_k$ required for transmitting MS data and the assigned communication capacity $C_k$ is calculated. When the communication capacity difference $\Delta C_k$ is a negative value, an MS with the minimum negative value is identified. The MS associated with the minimum $\Delta C_k$ value is denoted by $\overline{k}$. Because the communication capacity required by the MS $\overline{k}$ is larger than the already assigned communication capacity, the MS $\overline{k}$ requires an additional frequency sub-channel. Therefore, the BS must replace a spatial channel of a different MS with a spatial channel of the MS $\overline{k}$ to satisfy the communication capacity of the MS $\overline{k}$. However, a previous frequency sub-channel assigned to the MS $\overline{k}$ is excluded.

Therefore, to select an optimal frequency sub-channel of the MS $\overline{k}$, channel characteristic values $\overline{H}_k$ of channels, not including the frequency sub-channel assigned to the MS $\overline{k}$, are again calculated and communication capacities of the MSs are again calculated using $\overline{H}_k$. That is, communication capacity differences $\Delta C_k(=C_k-\overline{C}_k)$ are again calculated, and the minimum value of the communication capacity differences is stored. When the number of frequency sub-channels is M and the number of frequency sub-channels already assigned to the MS $\overline{k}$ is $\overline{M}_{\overline{k}}$, the communication capacity differences are calculated in relation to $(M-M_{\overline{k}}) \cdot K$. The minimum value of the communication capacity differences is selected for each frequency sub-channel.

A user k associated with the maximum value among the minimum communication capacity values in $(M-M_{\overline{k}})$ number of frequency sub-channels is selected, and a spatial channel of a corresponding frequency sub-channel is assigned to an MS $\overline{k}$. The above-described process is repeated until the communication capacity for each MS is satisfied. That is, it is determined that communication capacities of all MSs have been satisfied when all communication capacity difference values $\Delta C_k$ are positive. At this point, the channel re-assignment process is terminated.

Figure 3:
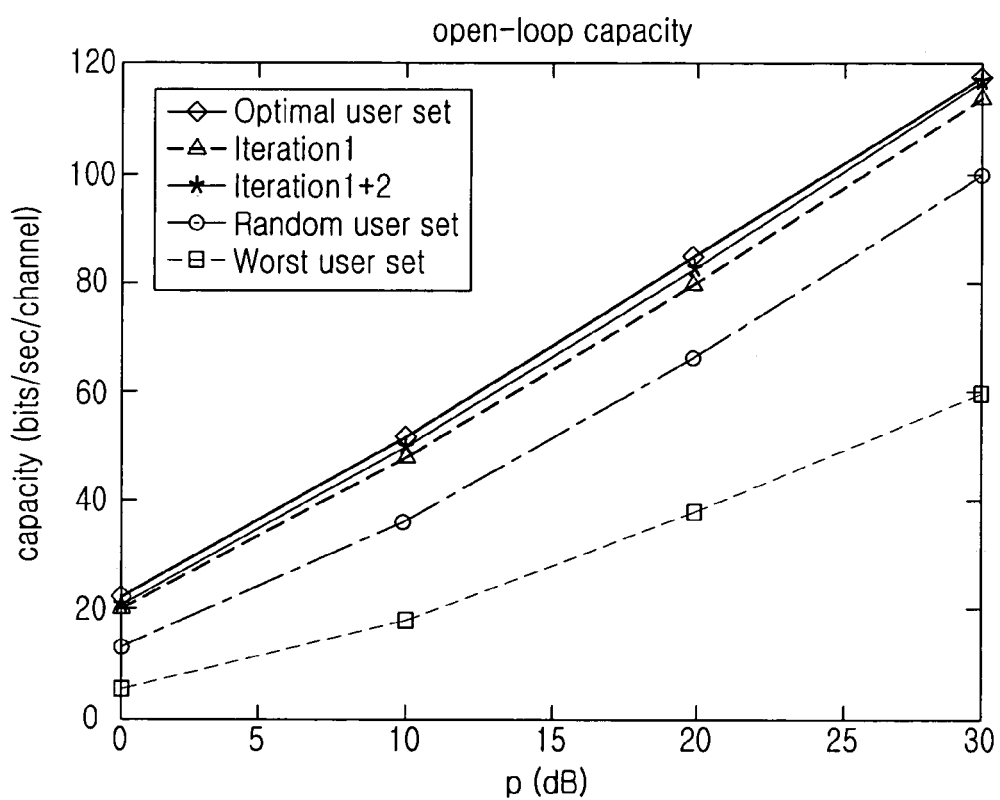
FIG. 3 is a graph illustrating communication capacity based on a channel assignment algorithm in accordance with the present invention.

FIG. 3 illustrates communication capacity based on a channel assignment algorithm in accordance with the present invention. Referring to FIG. 3, it is assumed that the number of transmit antennas, $N_t$ in the BS is 10 and all MSs have the same number of receive antennas $N_{r,k}$, i.e., 2. In this case, the number of spatial channels, $K_s$, is 5 and the total number of MSs, $K_a$, is 15. Additionally, it is assumed that the BS uses a communication capacity $C_{k,ol}$ when not making use of channel information of the MSs. Elements of a channel characteristic matrix $H_k$ are independent of each other, and are probability variables of a normal distribution with a mean value of 0 and a variance value of 1.

In FIG. 3, the x-axis indicates a total transmission power-to-noise power ratio, $\rho$, and the y-axis indicates a sum of communication capacities for all MSs. Here, $\rho$ is determined as an SNR (Signal-to-Noise Ratio) by a transmitting terminal.

An Optimal User Set with the maximum communication capacity sum when communication capacity sums for all possible user sets are produced and compared with each other is illustrated in FIG. 3. That is, the Optimal User Set has the maximum value of the communication capacity sums for all users. To produce the Optimal User Set, a large number of calculations are required.

In FIG. 3, Iteration 1 illustrates an example of setting a user set based on the algorithm illustrated in FIG. 2 to assign spatial channels. That is, an arbitrary spatial channel is assigned to a user, and optimized communication capacity is calculated for $$\left(\sum_{k=1}^{K} K_a - k + 1\right)$$

number of remaining users, not including the user, such that a frequency sub-channel is assigned to an SDM user set on the basis of the calculated communication capacity. When the SDM user set according to Iteration 1 is compared with the Optimal User Set, two user sets have similar communication capacities. However, Iteration 1 is advantageous in that the number of calculations required is reduced.

Iteration 2 illustrates an example of setting a user set through a channel re-assignment process. Iteration 2 has a more optimized communication capacity than Iteration 1.

However, in the Random User Set illustrated in FIG. 3, arbitrary MSs are randomly set as an SDM user set sharing a single frequency sub-channel without using a channel assignment algorithm. Additionally, the Worst User Set illustrated in FIG. 3 has the lowest communication capacity and is designated as an SDM user set sharing a single frequency sub-channel.

When the Optimal User Set, Iteration 1, and Iteration 2, as described above, are compared, the communication capacity in Iteration 1 proposed by the present invention is similar to the communication capacity in the Optimal User Set. As compared with the Optimal User Set, Iteration 1 is advantageous in that fewer computations are required. As compared with Iteration 1, Iteration 2 is advantageous in that a communication capacity is better optimized.

Figure 4:
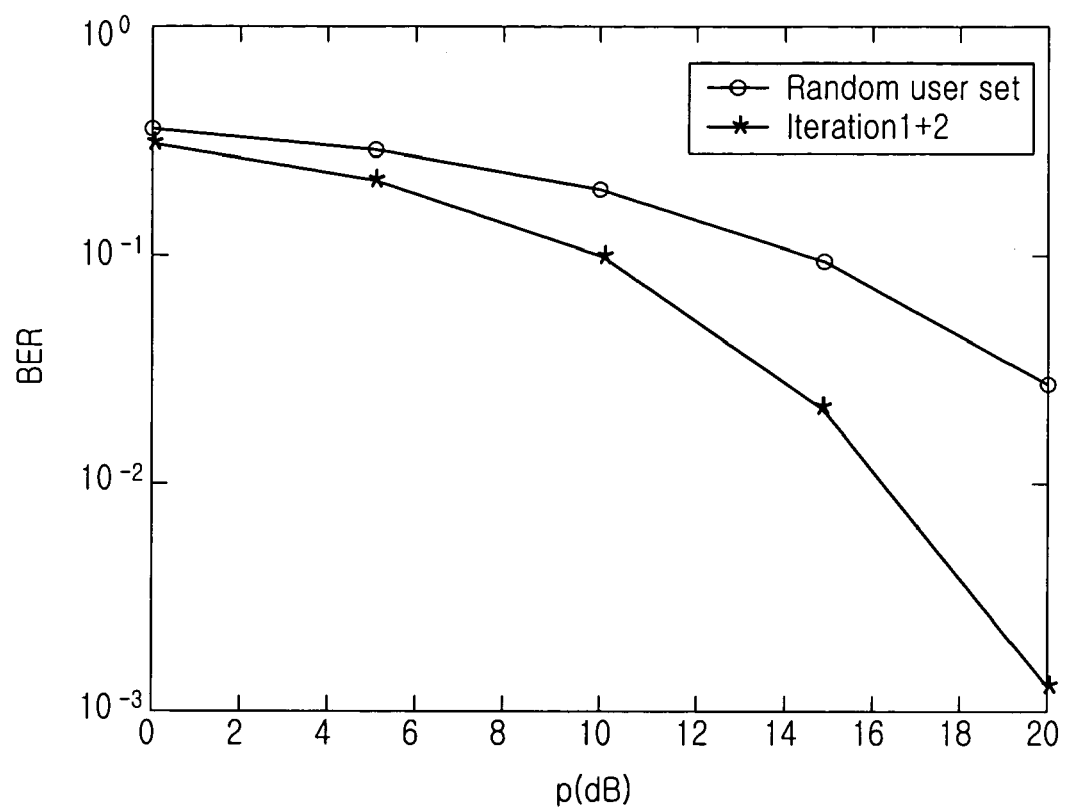
FIG. 4 is a graph illustrating a BER (Bit Error Rate) when the channel assignment algorithm is used in accordance with the present invention.

FIG. 4 is a graph illustrating a BER (Bit Error Rate) when the channel assignment algorithm is used in accordance with the present invention. More specifically, FIG. 4 illustrates the BER where a user set is designated on the basis of the communication capacity required for each MS, and the BER where arbitrary MSs are randomly designated as an SDM user set sharing a single frequency sub-channel without using the channel assignment algorithm.

As can be seen from FIG. 4, Iteration 2, which is based on the channel re-assignment process in accordance with the present invention, has a better BER than the Random User Set.

Second Embodiment

A correlation between MSs must be eliminated such that a single frequency sub-channel is assigned to a plurality of MSs in a MIMO-OFDM system using SDM. However, because a BS cannot correctly identify channel information of each MS in real-world applications, interchannel interference occurs between the MSs. Accordingly, the interchannel interference between the MSs degrades the performance of received signals of the entire system.

Therefore, the BS sets and assigns the same transmission power to the MSs to which the same frequency sub-channel is assigned. When a difference between transmission power values assigned to the MSs is large, a signal of larger transmission power for an MS interferes with a signal of smaller transmission power for another MS, thereby degrading the performance of the overall system. Accordingly, all transmission power values assigned to the MSs to which the same frequency sub-channel is assigned must be the same according to SDM.

The second embodiment of the present invention proposes an optimized algorithm and an effective pilot channel assignment process for estimating an assigned downlink channel when the BS assigns the downlink channel.

When the number of transmit antennas in the BS has been set, the communication capacity is defined as a function of an assigned spatial channel and noise power. In this case, if the BS does not identify channel information of each MS, the communication capacity of a $k^{th}$ MS is given by Equation (4).

$$C_{k,oi} = \log_2 \det(I_{N_{r,k}} + (P/(\overline{N}_{t,k}\sigma_k^2))\overline{H}_k\overline{H}_k^H)(b/s/Hz) \quad (4)$$

In Equation (4), P is the total transmission power, and $\overline{H}_k$ is a value defined by $H_k W_k$ in the BS, where $H_k$ is a channel matrix and $W_k$ is a nulling matrix. $(\cdot)^H$ denotes the Hermitian transpose, and det denotes the determinant. Here, $\sigma_k^2$ is noise power applied to a receiving terminal. When interference components from other MSs and adjacent cells are modeled in the normal distribution, $\sigma_k^2$ is power corresponding to a sum of noise and interference components. Using Equation (4), the BS considers power of noise and interference components as well as spatial channels to correctly assign a channel.

Unless the MS feeds back a value of $\sigma_k^2$ to the BS, the BS calculates a transmission power value without transmitting a signal for a predetermined time, thereby estimating channel characteristics of a corresponding MS. However, when no signal is transmitted from the BS for the predetermined time, transmission efficiency of the BS is degraded. A method for estimating interference noise power through a previously assigned pilot signal in the MIMO-OFDM system based on SDM in accordance with the present invention will now be described.

In the MIMO-OFDM system based on SDM, the BS can transmit a pilot signal to each MS, such that each MS can estimate downlink channel characteristics. This process is identical to the conventional pilot-based MIMO channel estimation algorithm. In order for each MS to estimate a downlink channel, the BS must consider channel interference in an SDM user set to assign pilots.

Figure 5:
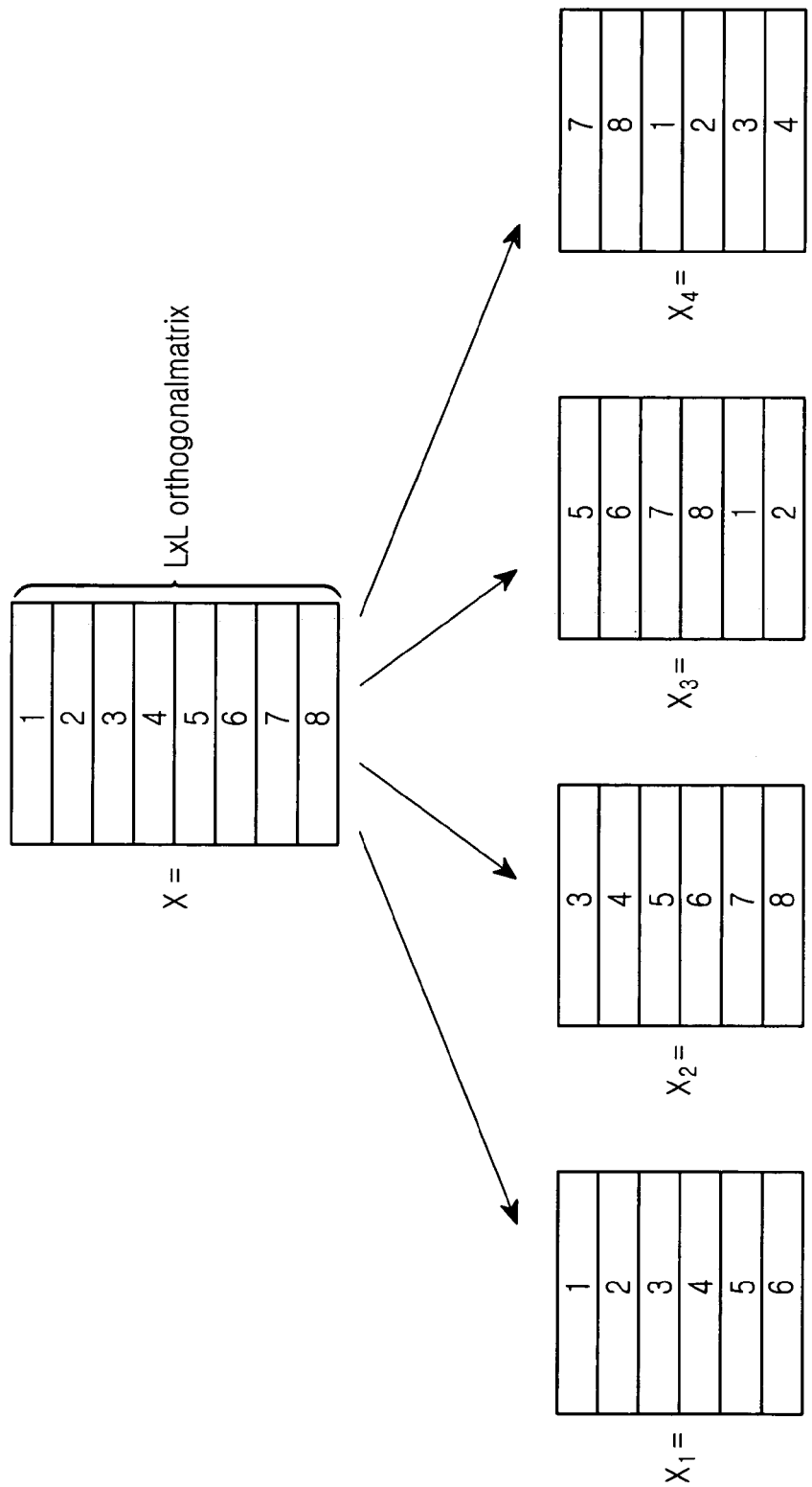
FIG. 5 illustrates a process for assigning a pilot channel in accordance with the present invention.

FIG. 5 illustrates a process for assigning a pilot channel in accordance with the present invention. Referring to FIG. 5, the BS transmits an $N_t \times L$ pilot matrix $X_T$ having a length L and $N_t$ pilot sequences using an arbitrary frequency sub-channel through transmit antennas corresponding to rows or sequences of the matrix. Each MS receives the same pilot signal $X_T$. A received signal corresponding to a $k^{th}$ MS is given by Equation (5).

$$Y_k = H_k X_T + N_k \quad (5)$$

In Equation (5), $N_k$ denotes interference noise. When elements of $N_k$ are calculated, $\hat{H}_k = Y_k X_T^*$ and $\hat{Y}_k = \hat{H}_k X_T$. In this case, $N_k$ becomes a channel estimation value. Interference noise power associated with the $k^{th}$ MS is given by Equation (6).

$$\hat{\sigma}_k^2 = \frac{\|Y_k - \hat{Y}_k\|_F^2}{N_{r,k}(L - tr\{R_X\})} \quad (6)$$

In Equation 6, $R_x$ is a matrix defined as $R_x = X_T^* X_T$. $tr\{\cdot\}$ is a sum of diagonal elements of the matrix. Using Equation (6), each MS can estimate the interference noise power associated with its own MS through a pilot signal in the MIMO-OFDM system.

Each MS feeds back the channel estimation value to the BS, such that the BS can more correctly calculate communication capacity through the fed-back channel estimation value.

When the BS can identify channel information of each MS, the communication capacity is given by Equation (7).

$$C_{k,cl} = \sum_{n=1}^{N} \log_2(\mu \lambda_n) \text{ (b/s/Hz)} \quad (7)$$

In Equation (7), $\lambda_n$ is the $n^{th}$ largest Eigen value in $(1/\sigma_k^2)\overline{H}_k\overline{H}_k^H$, $\mu$ is a constant satisfying $$P = \sum_{n=1}^{N} (\mu - \lambda_n^{-1})^+,$$

$(\cdot)^+$ denotes a positive value, and N is a value equal to or smaller than $N_{r,k}$.

The influence of interference between the MSs is time-variant and can greatly vary in every symbol when an MS in a frequency hopping system is present. In environments in which the influence of interference quickly varies, an interference component associated with a corresponding MS to which a predetermined frequency is assigned must be distinguished from an interference component associated with an MS of an adjacent cell in the frequency hopping system using a mean interference noise value.

The BS determines that $H_k$ in an original channel of each MS in a user set, to which a single frequency sub-channel is assigned, is changed to $\overline{H}_k$, and must estimate the channel characteristic value $\overline{H}_k$ to decode symbols of each channel.

The BS must multiply an $\overline{N}_{t,k} \times L$ pilot matrix $X_{T,k}$ by a weight matrix $W_k$ and transmit a result of the multiplication. Here, L is a pilot length. Accordingly, a received signal of the MS becomes $Y_k = \overline{H}_k X_{T,k} + N_k$. When the pseudo-inverse of $X_{T,k}$ is multiplied by $Y_k$, $\overline{H}_k$ can be estimated. However, it must be satisfied that $\overline{N}_{t,k} \leq L$. When $X_{T,k}$ is expressed by a value in which a unitary matrix is multiplied by a constant, an estimation error can be reduced. Accordingly, the BS transmits a pilot $X_{T,k}$ consisting of orthogonal rows with the sufficient length destined for the $k^{th}$ to $K^{th}$ MSs where k=1.

As described above, a pilot design is accomplished under the condition that no interference between SDM signals of the MSs to which a single frequency sub-channel is assigned is present. However, because the BS has incomplete information about a downlink channel in real environments, signal interference cannot be fully cancelled. Accordingly, interference from a different MS occurs and influences channel estimation.

To address this problem, the BS assigns a pilot channel in which a correlation value is smallest between SDM signals of the MSs to which the single frequency sub-channel is assigned.

As described above, the respective MSs have the same number of receive antennas and $\overline{H}_k$ or $X_{T,k}$ matrices have the same size for all k values. When the length of an assignable pilot $$L \geq \sum_{k=1}^{K} \overline{N}_{t,k},$$

$N_{t,k}$ rows of an L×L orthogonal matrix that are different from each other are selected, and interference between the MSs according to SDM can be minimized. For example, when the number of spatial channels $K_s$ is 2, first and second rows in a 4×4 orthogonal matrix are assigned to a pilot channel for MS 1, and third and fourth rows in the 4×4 orthogonal matrix are assigned to a pilot channel for MS 2, such that interference between the MSs can be fully cancelled according to channel estimation.

When the length of an assignable pilot $$L < \sum_{k=1}^{K} \overline{N}_{t,k},$$

the interference between the MSs cannot be fully cancelled. When the length of an assignable pilot $$L \geq \sum_{k=1}^{K} (L - \overline{N}_{t,k})$$

and the number of spatial channels $K_s=2$, each MS can distinguish and select some rows of the L×L orthogonal matrix such that interference can be minimized.

As illustrated in FIG. 5, the BS assigns pilots using an 8×8 matrix among orthogonal matrices such as Hadamard matrices and DFT (Discrete Fourier Transform) matrices. If four MSs or users share an orthogonal matrix where $\overline{N}_{t,k}=6$, 6×8 matrices in which some rows are identical are assigned as pilots for the four users as illustrated in FIG. 5.

In other words, the BS assigns a pilot corresponding to Rows 1, 2, 3, 4, 5, and 6 to MS 1 ($X_1$), assigns a pilot corresponding to Rows 3, 4, 5, 6, 7, and 8 to MS 2 ($X_2$), assigns a pilot corresponding to Rows 5, 6, 7, 8, 1, and 2 to MS 3 ($X_3$), and assigns a pilot corresponding to Rows 7, 8, 1, 2, 3 and 4 to MS 4 ($X_4$).

Pilot signals are assigned to the MSs adjacent to each other such that interference between the MSs can be minimized.

When the number of MSs is large and the pilot length is short, interference between the pilot signals assigned to the MSs can occur. Accordingly, when the pilot channel is assigned, a plurality of unitary matrices having a low correlation are generated using unitary space-time codes. The unitary matrices are assigned as pilots for the MSs such that the interference between the MSs can be cancelled. The unitary space-time coding matrices are normalized according to the number of users K, and the pilot length L, and can be generated on the basis of DFT matrices.

In this case, the signal interference can be reduced. However, signal interference components of the MSs cannot be uniformly reduced. The signal interference does not uniformly influence elements of $\overline{H}_k$. Accordingly, pilot signals of the MSs must be modified and exchanged according to time. That is, when a position of a pilot assigned according to time is continuously changed, each MS calculates a mean value between pilots, such that the performance of channel estimation can be improved.

Figure 6:
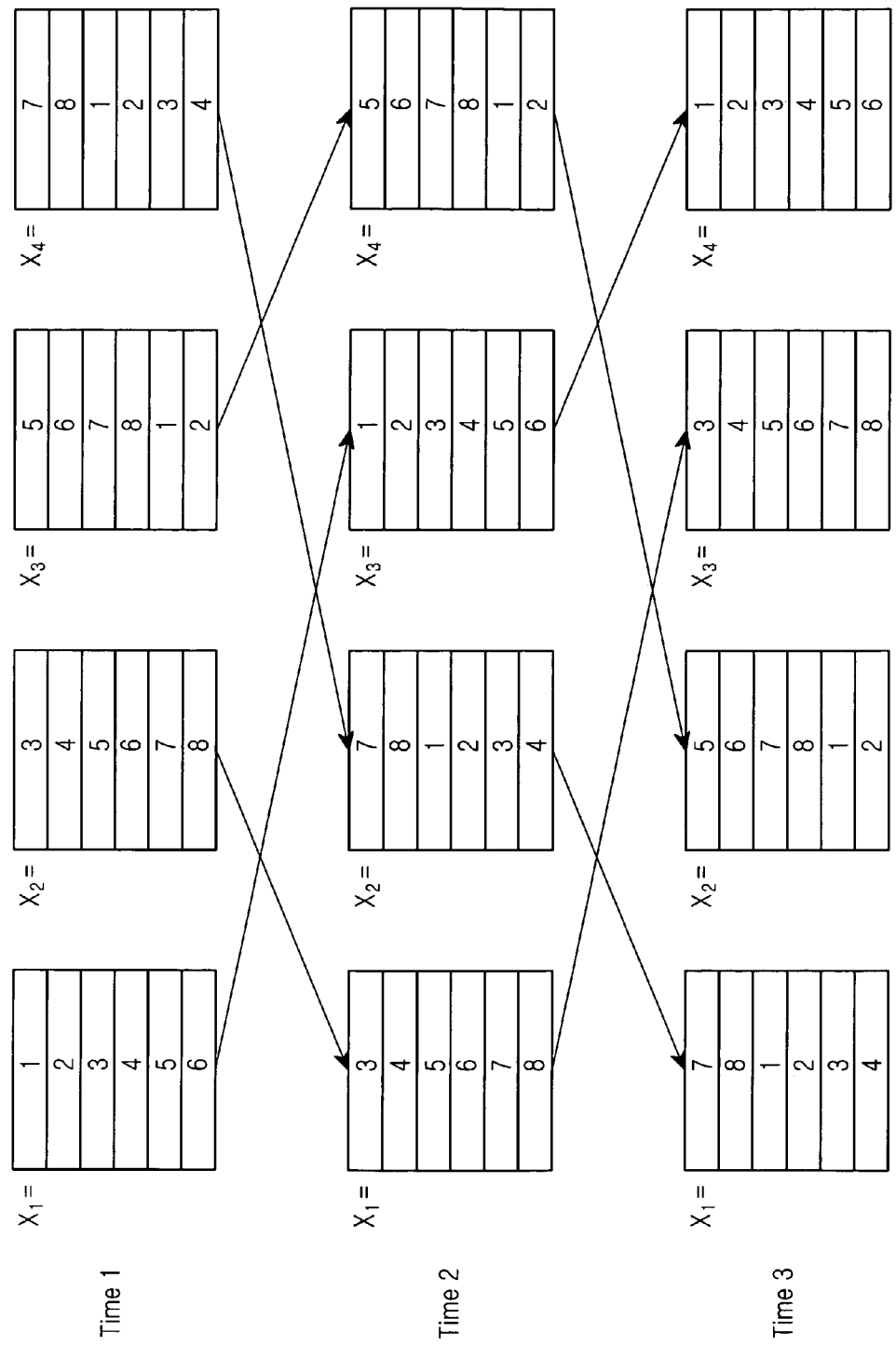
FIG. 6 illustrates a process for assigning a pilot signal based on SDM in accordance with the present invention.

A pilot assignment process based on TDM (Time Division Multiplexing) will be described with reference to FIG. 6. Rows of one orthogonal matrix are appropriately classified as pilot signals for the MSs, such that interference between the MSs can be minimized as illustrated in FIG. 5.

For Time 1, the BS assigns a pilot corresponding to Rows 1, 2, 3, 4, 5, and 6 to MS 1 ($X_1$), assigns a pilot corresponding to Rows 3, 4, 5, 6, 7, and 8 to MS 2 ($X_2$), assigns a pilot corresponding to Rows 5, 6, 7, 8, 1, and 2 to MS 3 ($X_3$), and assigns a pilot corresponding to Rows 7, 8, 1, 2, 3, and 4 to MS 4 ($X_4$).

For Time 2, the BS assigns a pilot corresponding to Rows 3, 4, 5, 6, 7, and 8 to MS 1 ($X_1$), assigns a pilot corresponding to Rows 7, 8, 1, 2, 3, and 4 to MS 2 ($X_2$), assigns a pilot corresponding to Rows 1, 2, 3, 4, 5, and 6 to MS 3 ($X_3$), and assigns a pilot corresponding to Rows 5, 6, 7, 8, 1, and 2 to MS 4 ($X_4$).

For Time 3, the BS assigns a pilot corresponding to Rows 7, 8, 1, 2, 3, and 4 to MS 1 ($X_1$), assigns a pilot corresponding to Rows 5, 6, 7, 8, 1, and 2 to MS 2 ($X_2$), assigns a pilot corresponding to Rows 3, 4, 5, 6, 7, and 8 to MS 3 ($X_3$), and assigns a pilot corresponding to Rows 1, 2, 3, 4, 5, and 6 to MS 4 ($X_4$).

Each MS sums all channel estimation values obtained for Times 1 to 3 and calculates a mean value between the channel estimation values. The signal interference focused on some elements of $\overline{H}_k$ between the MSs is cancelled. A temporary and rapidly degraded channel estimation value can be compensated for by means of the channel estimation values received for Times 1 to 3.

Figure 7A:
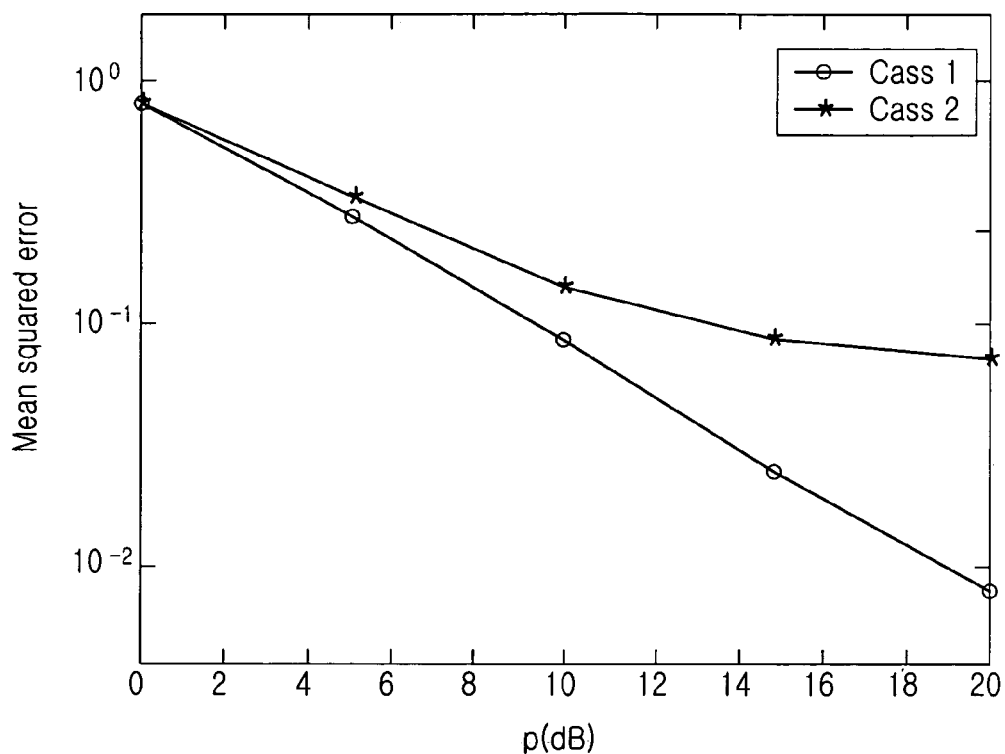
FIGS. 7A and 7B illustrate pilot channel assignment performances in accordance with the present invention.
Figure 7B:
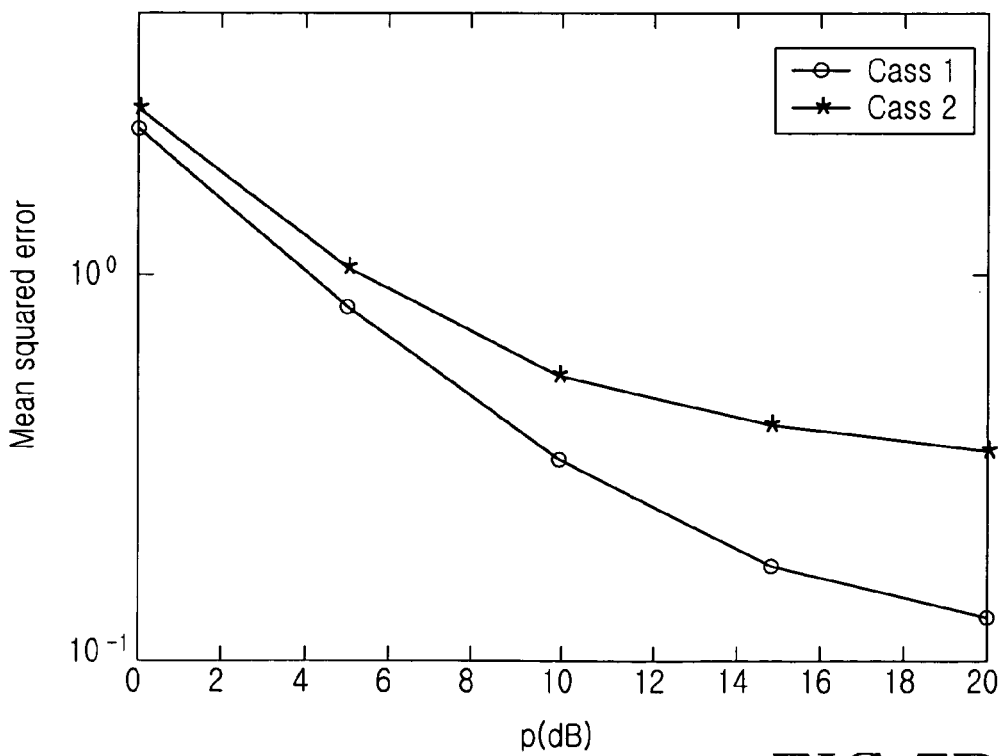

FIGS. 7A and 7B illustrate pilot channel assignment performances in accordance with the present invention. Additionally, FIGS. 7A and 7B illustrate mean squared errors in a total transmission power-to-noise power ratio ρ.

In FIG. 7A, the number of spatial channels, $K_s$, is 2, the number of transmit antennas of a BS, $N_t$, is 4, and the number of receive antennas of a $k^{th}$ MS, $N_{r,k}$, is 2. In FIG. 7B, the number of spatial channels, $K_s$, is 4, the number of transmit antennas of the BS, $N_t$, is 12, and the number of receive antennas of a $k^{th}$ MS, $N_{r,k}$, is 2.

In Case 1, as illustrated in FIGS. 7A and 7B, rows of a single orthogonal matrix are assigned that are distinguished from each other to minimize interference between the MSs. In Case 2, as illustrated in FIGS. 7A and 7B, the identical rows of an orthogonal matrix are assigned to all users using the identical pilot signals in a state in which interference between the MSs is not taken into account.

Assuming that signal interference between the MSs is caused by an uplink channel information error, power of the uplink channel information error is 0.05 times channel power. As illustrated in FIGS. 7A and 7B, when different elements of the orthogonal matrix are assigned to different MSs through the pilot signals, it can be seen that Case 1 has a lower downlink channel estimation error as compared with Case 2.

As is apparent from the above description, the present invention has a number of advantageous effects. For example, the present invention calculates the optimized communication capacity to produce an optimal user set at the time of sequentially assigning a single frequency sub-channel to users in a MIMO-OFDM system based on SDM. Consequently, the present invention reduces the number of calculations required to produce the user set.

When a downlink channel is estimated in relation to a single frequency sub-channel, a BS assigns different rows of a corresponding orthogonal matrix having a pilot length to MSs, thereby minimizing interference between the MSs according to SDM.

Although preferred embodiments of the present invention have been disclosed for illustrative purposes, those skilled in the art will appreciate that various modifications, additions, and substitutions are possible, without departing from the scope of the present invention. Therefore, the present invention is not limited to the above-described embodiments, but is defined by the following claims, along with their full scope of equivalents.

What is claimed is:

1. A method for assigning spatial channels from a BS (Base Station) including multiple transmit antennas to MSs (Mobile Stations) respectively including multiple receive antennas in an OFDM (Orthogonal Frequency Division Multiplexing) system that transmits data using a plurality of frequency sub-channels, the method comprising the steps of:

assigning a plurality of spatial channels to each of the frequency sub-channels;

sequentially selecting MSs for maximizing a total communication capacity of the spatial channels;

assigning the spatial channels assigned to each sub-channel to the MSs; and continuously replacing remaining MSs, not including a replacement MS, when replacing the replacement MS that is selected from the MSs to which the spatial channels are assigned with another MS, are until the communication capacity is not further increased.

2. The method of claim 1, wherein the step of sequentially selecting the MSs, comprises:

selecting the MSs according to a number of spatial channels; and assigning the spatial channels to the selected MSs.

3. The method of claim 1, further comprising the steps of:

calculating communication capacities of the MSs to which the sub-channel is assigned;

comparing the calculated communication capacities with communication capacities required for the MSs; and additionally assigning a new spatial channel to an MS having a required communication capacity that is larger than a calculated communication capacity.

4. The method of claim 1, wherein the replaced MS has a required communication capacity that is larger than a calculated communication capacity.

5. A method for assigning a spatial channel from a Base Station (BS) in an Orthogonal Frequency Division Multiplexing (OFDM) communication system including the BS including a plurality of transmit antennas and Mobile Stations (MSs) including a plurality of receive antennas, wherein a sub-channel for transmitting data is divided into at least one spatial channel based on a Spatial Division Multiplexing (SDM) system, the method comprising the steps of:

(a) temporarily assigning a first MS in a first spatial channel among the divided spatial channels;

(b) calculating a communication capacity of the first MS in the first spatial channel;

(c) obtaining communication capacity for each of the other MSs by repeatedly performing steps (a) and (b) for each other mobile station in the first spatial channel;

(d) selecting an MS having the maximum communication capacity; and (e) finally assigning the selected MS in the first spatial channel.

6. The method of claim 5, wherein, if the BS does not recognize a channel state for each MS, the communication capacity for each MS, k, is determined by:

$$C_{k,oi} = \log_2 \det(I_{N_{r,k}} + (P/(\overline{N}_{t,k}\sigma_k^2))\overline{H}_k\overline{H}_k^H)(b/s/Hz)$$

wherein P is a total transmission power, $\overline{H}_k$ is a value defined by $H_k W_k$, in the BS, where Hk is a channel matrix and Wk is a nulling matrix, $(\cdot)^H$ denotes the Hermitian transpose, $\sigma_k^2$ is noise power applied to a receiving terminal, and det denotes the determinant.

7. The method of claim 5, wherein, if the BS recognizes the channel state of each MS, the communication capacity for each MS, k, is determined by:

$$C_{k,cl} = \sum_{n=1}^{N} \log_2(\mu\lambda_n) \text{ (b/s/Hz)} \qquad (7)$$

wherein $\lambda_n$ is the $n^{th}$ largest Eigen value in $(1/\sigma_k^2)\overline{H}_k\overline{H}_k^H$, μ is a constant satisfying $$P = \sum_{n=1}^{N} (\mu - \lambda_n^{-1})^+,$$

$(\cdot)^+$ denotes a positive value, and N denotes the number of receive antennas of the MS.

8. The method of claim 5, further comprising assigning an MS in a second spatial channel by:

(f) sequentially temporally assigning the MSs except for the selected MS in the second spatial channel;

(g) determining the total communication capacity of the system of each MS whenever sequentially temporally assigning; and (h) finally assigning the MS of which the total communication capacity is the maximum in the second spatial channel.

* * * * *